April 14, 1970  J. C. PEARCE  3,505,755

FISH LURE

Filed Feb. 6, 1968

INVENTOR
JOHN C. PEARCE
BY
ATTORNEY

United States Patent Office 3,505,755
Patented Apr. 14, 1970

3,505,755
FISH LURE
John C. Pearce, Randolph County, near Lumpkin,
Ga. (% Streak-O-Lean Lure Company, Lumpkin,
Ga. 31815)
Filed Feb. 6, 1968, Ser. No. 703,416
Int. Cl. A01k 85/00
U.S. Cl. 43—42.06                    3 Claims

ABSTRACT OF THE DISCLOSURE

A flexible plastic fish lure which resemblies a worm, eel or any other bug or creature, sometimes called a live-action lure, with a substance or compound inside which may include fish oil and other odorous substances attractive to those fish affected by smell. An elongated wick-like member of textile fibers is saturated with the substance or compound and positioned to be covered by the liquid plastic material which encapsulates the wick-like member after solidifying. Thus, when the lure leaves the place of fabrication it is sealed until used and the oil and grease and odor is not substantially apparent and will not stain the fisherman's clothes but one a hook is inserted through the plastic and penetrates the wick-like material and makes an opening from the interior to the outside and the lure is brought into contact with the water the odor is released.

BACKGROUND OF THE INVENTION

Field of the invention

A primary or significant classification would seem to be most particularly artificial bait having a substance emitting and/or water passage and possibly artificial bait with flexible appendages e.g., worms.

General comments on prior art

It is, of course, well known in the fishing lure art to saturate or coat a fishing lure of many types with a fish-getting compound sometime referred to form an advertising standpoint as magic oils or miracle fish-getting compounds some of which use natural fish products like fish oil and other substances obtained from fishes. Ordinarily these fish-getting compounds are sold in a bottle and a fisherman applies the compound directly to his lure just prior to fishing. The effect of the water and the friction of the lure moving in the water removes the compound rapidly making it necessary for the fisherman to continue periodically to apply the compound. The substance can be applied to the exterior of a lure in some other manner as for example by attaching a swatch of material soaked in the compound and selling the lure already packaged in this manner. However, once the package is opened the odor begins to become apparent and packaging must be effective or the compound will dissipate during storage. Also, if the compound is on a swatch of material on the outside of the lure the friction of the water and the dilution by the water rapidly dissipates the compound. In addition, it is troublesome to carry a separate bottle of fish-getting compound and apply it to the lure in the boat or in the surf or some other place. Prior art devices which attach the compound to the lure to release same in the water are much more expensive then the present device and in many instances much less effective.

DESCRIPTION OF A PREFERRED EMBODIMENT

The molding of live-action, flexible plastic worms, eels and other creatures for fishing lures is well known and a very common art at this time and will not be discussed in detail. Many plastics can be obtained which are mixed and poured into a mold having cavities representing the particular creature to be formed. The present invention can be embodied in many different types of creatures such as elongated creatures like worms, snakes and eels but also frogs, minnows and an unlimited number of creatures both real and imaginary. For sake of illustration and a preferred form for fishing, the present device resembles a small eel of any color with a long continuous slick body having a small sinous portion near the head defining a curved head and having a split tail which is flat on both sides causing the eel to wiggle in the water when pulled by a fishing line. The material is preferably a soft, tough substantially inert plastic material which is molded with an internal elongated wick-like member which may be of textile fibers such as nylon or cotton yarn twisted and spun into a thread-like member or can be a piece of string or small rope. The wick-like member is saturated with a fish-getting solution such as a mixture of codfish oil, mineral oil and other animal oils and the wick-like member is encapsulated in the plastic eel and sealed therein during manufacture. Thereafter until the hook is inserted the fish-getting compound is tightly sealed inside the plastic case which acts as a container and the lure may be sold loose with less likelihood of contamination to other things. To place the fish-getting compound in operation, the fisherman inserts the hook in the usual manner of preparing a plastic fishing eel for use by inserting the barbed sharp pointed end of the hook in the head of the plastic eel and pushing it down through a portion of the head leading it out from one side of the body at the same time puncturing the plastic case into the cavity which holds the wick-like member thereby releasing the compound to the outside.

DESCRIPTION OF THE DRAWINGS

Other and further objects and advantages of my invention will become apparent upon reading the following specification taken in conjunction with the accompanying drawings, in which.

SPECIFICATION OF A PREFERRED EMBODIMENT

Figure 1:
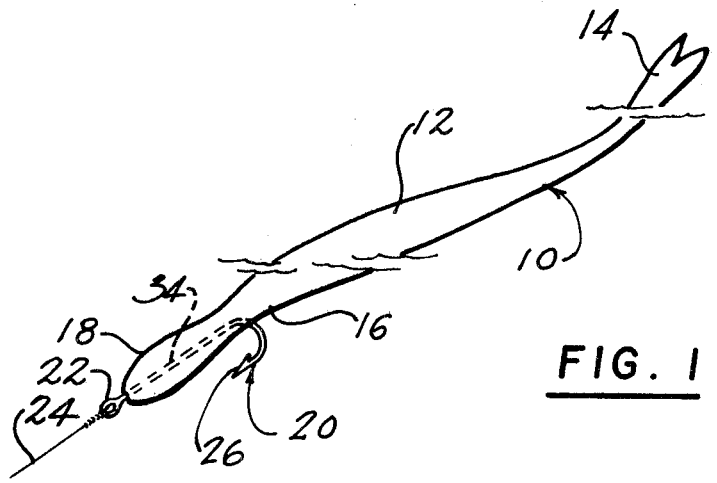
FIG. 1 is a perspective view of a lure made in accordance with the present invention shown diagrammatically in use in the water.

The lure is designated generally by reference number 10 and as mentioned previously is a flexible, lightweight, tough elongated lure which is manufactured from one of the many plastic materials that are mixed liquid and caused to form by chemical or heat catalyst or otherwise into a solid plastic material. The particular form of the invention in FIG. 1 resembles a small fish or eel having an elongated tapered body 12, a divided flat tail 14. The body 12 is somewhat sinuous at 16 forming a head 18. A hook designated generally by reference numeral 20 has a hook-eye 22 to which is attached a leader 24 pulling the lure 10 in the usual manner.

Figure 2:
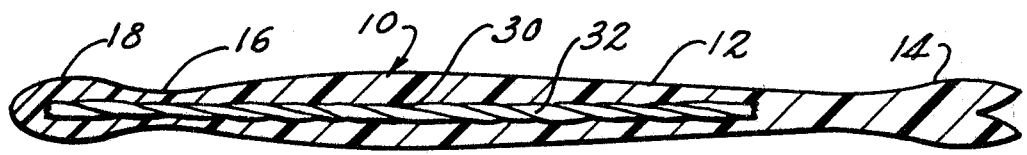
FIG. 2 is a cross-sectional view taken substantially medially and longitudinally through the lure shown in FIG. 1.
Figure 3:
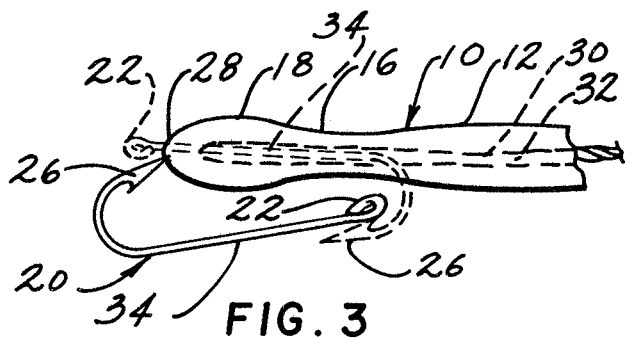
FIG. 3 is a side elevation view of the lure shown in FIG. 1 demonstrating from full lines to dotted lines the way a hook is inserted in the lure to place the fish-getting compound into operation.

Referring to FIG. 2, as seen in cross-section, when manufactured the flexible plastic lure 10 in FIG. 1 is provided with a cavity 30 in which is sealed a wick-like member 32 which is an elongated, flexible member manuactured from yarn or thread by twisting or otherwise and which may be a piece of string or textile yarn used in weaving carpet. Some materials such as cotton absorb the compound and may be used or other material such as cellulose, polypropelene or other materials which do not actually absorb the compound may be used. The member 32 is saturated with a fish-getting compound such as a mixture of cod-liver oil, mineral oils and other animal oils until it is saturated and then is caused to assume a position inside the liquid plastic of the lure 10 which solidifies thereby sealing the member 30 inside and tightly encapulating same from the atmosphere. In the condition of FIG. 2, the fish-getting compound is sealed from the outside and will remain sealed for a reasonably long time until placed into use. Therefore, it is not necessary to tightly package the lure 10 or to carry it wrapped in plastic or other material nor will the lure bleed or exude the material in the member 32 to the surface and make the hands and fingers messy and smelly when handling the lure after removal from the package. The lure 10 is removed when ready for use and is substantially clean and smooth on the surface and it is a fairly clean operation to take the hook 20 shown in FIG. 3 and to insert the barbed point 26 by the point 28 into the head 18 of the eel 12 manipulating and shoving the shank 34 of the hook until the barbed point 26 penetrates the exterior of the eel 12 again and assumes the dotted line position in FIG. 3 outside the lure with the shank 34 inside the lure having created a passageway from the exterior of the body of the lure 10 to the interior cavity 30 thereby exposing the lure to the atmosphere or to the water in which it operates. After the hook has been inserted as shown in FIG. 3, the fish-getting compound goes into operation and slowly seeps from the lure gradually creating the odor that attracts some fish.

While I have shown and described a particular embodiment of my invention this is by way of illustration only and does not constitute the only form of the invention since as mentioned previously any number of different types of creatures may be reproduced as the main body of the lure and various other alterations, changes, deviations, eliminations, conditions, substitutions, removals, combinings, departures and modifications may be made in the embodiment shown and described without departing from the scope of my invention.

What is claimed is:
1. In a fishing lure which is attached to a fishing line and used in the water to attract fish:

(a) a molded, flexible and bendable lure body of unitary construction made from substantially inert plastic-like material to simulate bait and to have action in the water,
(b) an elongated, wick-like axially extending member molded inside said flexible lure body during the molding thereof and being tightly confined and sealed within said lure body and surrounded by a thickness of plastic material, said thickness being greater than the thickness of said member for the greater portion of the length of said member and which protects said wick-like member from substantial accidental release through the outside of said lure body as might occur during shipping and the like and substantially prevents said wick-like member from being disturbed until deliberately used,
(c) said wick-like member being saturated with a fish-getting compound such as cod-liver oil solution and which solution is caused to emit from the flexible lure body upon the insertion and penetration of a member such as the sharp tip of a first hook inserted from the outside of said lure body through the material of the lure body and into the wick-like member to create an opening through the lure body through which said fish-getting compound may emit.

2. The device claimed in claim 1, wherein:
said body is in the form of an elongated creature simulating an eel, worm or other fish lure and said wick-like member is elongated, textile string which has been soaked with said fist-getting compound prior to being molded internally inside of said flexible lure body.

3. The lure in claim 1:
said wick-like member being flexible, continuous and substantially solid in construction and extending along a substantial length of said body.

References Cited

UNITED STATES PATENTS 3,449,853 6/1969 Shearer _____ 43—42.34

ALDRICH F. MEDBERRY, Primary Examiner

J. H. CZERWONKY, Assistant Examiner

U.S. Cl. X.R.

43—42.24